United States Patent [19]

Kunimune et al.

[11] Patent Number: 4,970,283

[45] Date of Patent: Nov. 13, 1990

[54] SILICON-CONTAINING SOLUBLE POLYIMIDE PRECURSOR, ITS CURED MATERIAL, AND METHOD FOR PREPARING THEM

[75] Inventors: Kouichi Kunimune, Ichihara; Haruo Kato; Yoshiya Kutsuzawa, both of Yokohama, all of Japan

[73] Assignee: Chisso Corporation, Osaka, Japan

[21] Appl. No.: 269,299

[22] Filed: Nov. 10, 1988

[30] Foreign Application Priority Data

Oct. 11, 1987 [JP] Japan ................. 62-283728
Nov. 11, 1987 [JP] Japan ................. 62-285050

[51] Int. Cl.$^5$ ............................................. C08G 77/04
[52] U.S. Cl. .................................. 528/26; 528/28; 528/38
[58] Field of Search ..................... 528/26, 28, 38

[56] References Cited

U.S. PATENT DOCUMENTS

| | | | |
|---|---|---|---|
| 3,926,911 | 12/1975 | Greber | 260/46.5 |
| 3,948,835 | 4/1976 | Greber | 260/2 |
| 3,950,308 | 4/1976 | Greber | 260/46.5 |
| 4,499,252 | 2/1985 | Igarashi | 528/38 |
| 4,591,653 | 5/1986 | Kunimune | 556/419 |
| 4,609,700 | 9/1986 | Kunimune | 524/104 |
| 4,656,238 | 7/1987 | Kunimune et al. | 528/26 |
| 4,672,099 | 6/1987 | Kunimune | 528/26 |
| 4,818,806 | 4/1989 | Kunimune et al. | 528/38 |

FOREIGN PATENT DOCUMENTS

| | | |
|---|---|---|
| 0208396 | 1/1987 | European Pat. Off. |
| 0216007 | 4/1987 | European Pat. Off. |
| 265326 | 11/1987 | Japan. |
| 15223 | 1/1988 | Japan. |

*Primary Examiner*—Melvyn I. Marquis
*Assistant Examiner*—Karen A. Hellender
*Attorney, Agent, or Firm*—Fred Philpitt

[57] ABSTRACT

The present invention intends to provide a cured material of a silicon-containing polyimide having high heat resistance, low coefficient of thermal expansion, no brittleness and high hardness.

In order to enable liquid coating and impregnation, a silicon-containing soluble polyimide precursor is first prepared. The precursor may be prepared by mixing five compounds of

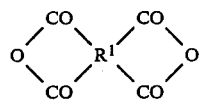

($R^1$ is a tetravalent carbon cyclic aromatic group), $NH_2-R^2-NH_2$ ($R^2$ is an aliphatic group, an alicyclic group, an aromatic aliphatic group or a carbon cyclic aromatic group, a polysiloxane group or 1,3,5-triazine group having a substituent), $NH_2-R^3-SiR^4{}_{3-k}X^1{}_k$ and $NH_2-R^3-SiR_{3-m}{}^4X^1{}_m$ ($R^3$ is $-(CH_2)_s-$,

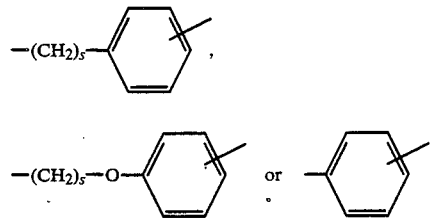

wherein s is an integer of 1 to 4, and $R^4$ is an alkyl group, a phenyl group or an alkyl-substituted phenyl group and $SiX_4{}^2$, $X^1$ and $X^2$ are independently an alkoxy group, an acetoxy group, a halogen or a hydroxyl group), and then heating the mixture. Coating or impregnation of this precursor is then given and afterward heated at a temperature of 50° to 500° C., thereby obtaining the cured material of the silicon-containing polyimide.

15 Claims, 1 Drawing Sheet

SILICON-CONTAINING SOLUBLE POLYIMIDE PRECURSOR, ITS CURED MATERIAL, AND METHOD FOR PREPARING THEM

BACKGROUND OF THE INVENTION

1. Field of the Invention

The present invention relates to a silicon-containing soluble polyimide precursor, a cured material of the polyimide which is obtained by heating the above-mentioned precursor to crosslink/cure it, and a method for preparing them.

2. Description of the Prior Art

Polyimide resins have maximum heat resistance and low coefficient of thermal expansion considering organic polymer compounds, but these characteristics are inferior to those of inorganic compounds.

In order to improve surface hardness, wear resistance and the like of the polyimide resin with the intention of causing these properties to come up to those of inorganic compounds, a means for filling the polyimide resin with an inorganic material is taken. In this case, however, breakage is liable to occur between the organic material and the polyimide resin inconveniently, and therefore such a means is not always considered to be preferable.

On the other hand, silica which is one example of the inorganic materials has practically preferable characteristics, e.g., low coefficient of thermal expansion and high hardness in addition to excellent heat resistance, but it is brittle and poor in processability and moldability. For this reason, use applications of silica are limited. For the purpose of improving the processability and moldability, a variety of compounds have been synthesized in which groups which are bonded to each silicon are partially replaced with alkyl groups. This technique is successful to some extent, for example, as polydimethylsiloxanes and the like, but such compounds involve drawbacks such as noticeable deterioration of heat resistance, perceptible increase in coefficient of thermal expansion and outstanding degradation of hardness.

For the elimination of these drawbacks, many techniques of chemically combining polyimides with silicon compounds have been reported (e.g., Japanese Patent Laid-Open Publication Nos. 143328/1982, 7473/1983 and 13631/1983). These techniques are based on the partial replacement of a diamine component, which is the raw material of the polyimide, by a polydisiloxane which is terminated with diamines at both the ends thereof.

Japanese Patent Publication No. 32162/1983 has suggested a crosslinked polyimide having a siloxane group which can be prepared by mixing a polyamide acid, which is terminated with reactive silicon compounds at both the ends thereof, with a polysiloxane having hydroxyl groups at both the ends thereof, and then heating the mixture.

Furthermore, as a process of forming silica films, there has been suggested a technique of calcining a reactive silane such as an alkoxy silane or an acetoxy silane (e.g., Japanese Patent Publication Nos. 16488/1977 and 20825/1977, Japanese Patent Laid-Open Publication Nos. 34258/1980 and 250032/1986, and U.S. Pat. No. 4,408,009).

Products disclosed in the above-mentioned Japanese Patent Laid-Open Publication Nos. 143328/1982, 7473/1983 and 13631/1983 still have disadvantages such as noticeable deterioration of heat resistance, perceptible increase in coefficient of thermal expansion and outstanding degradation of hardness, as in the above-mentioned polydimethylsiloxane and the like.

The compound disclosed in Japanese Patent Publication No. 32162/1983 is excellent in affinity for inorganic compounds but cannot provide any materials having low coefficients of thermal expansion.

With regard to the above-mentioned technique of calcining a reactive silane such as an alkoxy silane or an acetoxy silane, films synthesized by this technique are very brittle, and the thickness of the films is at most several thousand angstroms.

As discussed above, the conventional techniques have various problems, and thus it is now demanded to develop satisfactory substances for the boundary between inorganic and organic materials.

SUMMARY OF THE INVENTION

An object of the invention is to provide a silicon-containing soluble polyimide precursor which has a viscosity suitable for the formation of coating films by a coating operation and which is capable of forming tough and strong adhesive coating films having excellent heat resistance, high hardness and low coefficient of thermal expansion by the calcination of coated films; a cured material of the silicon-containing polyimide which is obtained by heating/curing the precursor; and a method for preparing them.

The first aspect of the present invention is directed to a silicon-containing soluble polyimide precursor which mainly comprises a component represented by the following general formula (I) and which has a logarithmic viscosity number of 0.05 to 5 dl/g when measured at a concentration of 0.5 g/dl at 30°±0.01° C. in a solvent:

$$[R^4{}_{3-k}Si-R^3-L-(R^2-L)_n-R^3-SiR^4{}_{3-m}O_{(k+m)/2}]_p[SiO_2]_q \quad (I)$$

wherein L is a structural unit of any of the following formula (II),(III) and (IV); $R^2$ is an aliphatic group having 2 to 12 carbon atoms, an alicyclic group having 4 to 30 carbon atoms, an aromatic aliphatic group having 6 to 30 carbon atoms, a carbon cyclic aromatic group having 6 to 30 carbon atoms, a polysiloxane group represented by the following formula (V) or a group represented by the following formula (V'); $R^3$ is —(CH$_2$)$_s$—,

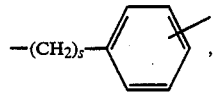

wherein s is an integer of 1 to 4; and $R^4$ is independently an alkyl group having 1 to 6 carbon atoms, a phenyl group or an alkyl substituted phenyl group having 7 to 12 carbon atoms; k is an integer of $0 \leq k \leq 3$; m is $0 \leq m \leq 3$ but $k+m \leq 1$; n is an integer of 1 or more; and each of p and q is a positive integer;

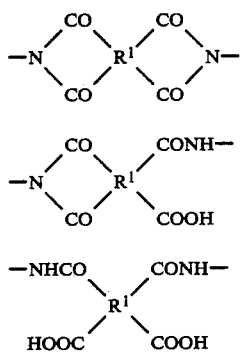 (II)

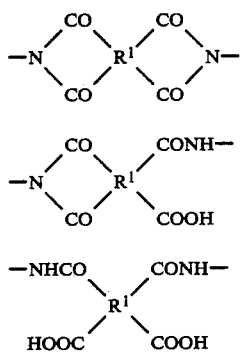 (III)

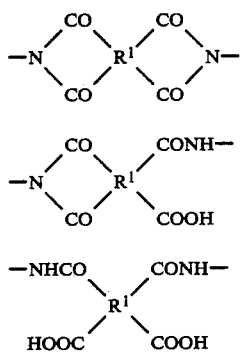 (IV)

wherein R¹ is a tetravalent carbon cyclic aromatic group, and two carbonyl groups constituting one imide, in the formulae (II) and (III) are mutually attached to ortho positions, and one amide group and one carboxyl group in the formulae (III) and (IV) are mutually attached to ortho-positions;

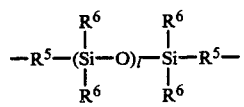 (V)

wherein R⁵ is independently —(CH$_2$)s—,

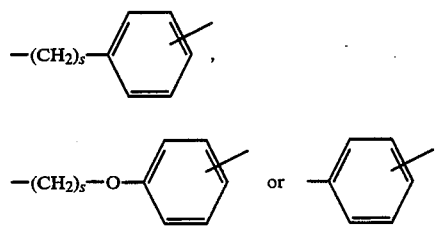

wherein s is an integer of 1 to 4, and R⁶ is independently an alkyl group having 1 to 6 carbon atoms, a phenyl group or an alkyl-substituted phenyl group having 7 to 12 carbon atoms, l is a value of $1 \leq l \leq 100$;

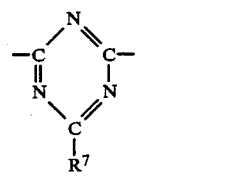 (V')

wherein R⁷ is an aliphatic group having 8 or less carbon atoms, an aromatic aliphatic group or hydrogen.

The second aspect of the present invention is directed to a cured material of a silicon-containing polyimide obtained by heating a solution containing the compound represented by the above-mentioned general formula (I) as the main component at a temperature of 50° to 500° C. In the case of the cured material, the general formula (I) can be represented by

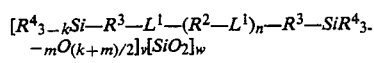 (I')

wherein L¹ is

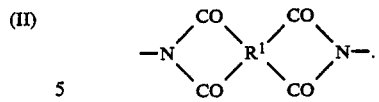 (II)

The third aspect of the present invention is directed to a method for preparing the above-mentioned precursor which comprises the step of reacting compounds having the following general formulae in suitable amounts, i.e., a mole of

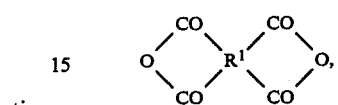

b mole of NH$_2$—R²—NH$_2$, c mole of each of NH$_2$—R³—SiR⁴$_{3-k}$X¹$_k$ and NH$_2$—R³—SiR⁴$_{3-m}$X¹$_m$, and d mole of SiX²$_4$, wherein X¹ and X² are independently an alkoxy group, an acetoxy group, a halogen or a hydroxyl group, in ratios of $1.8 \leq (2b+c)/a \leq 2.2$ and $0.03 \leq d/a \leq 33$ in the presence of 70% by weight or more of a solvent at a temperature of 0° to 200° C. for 0.2. to 20 hours.

DETAILED DESCRIPTION OF THE INVENTION

Figure 1:
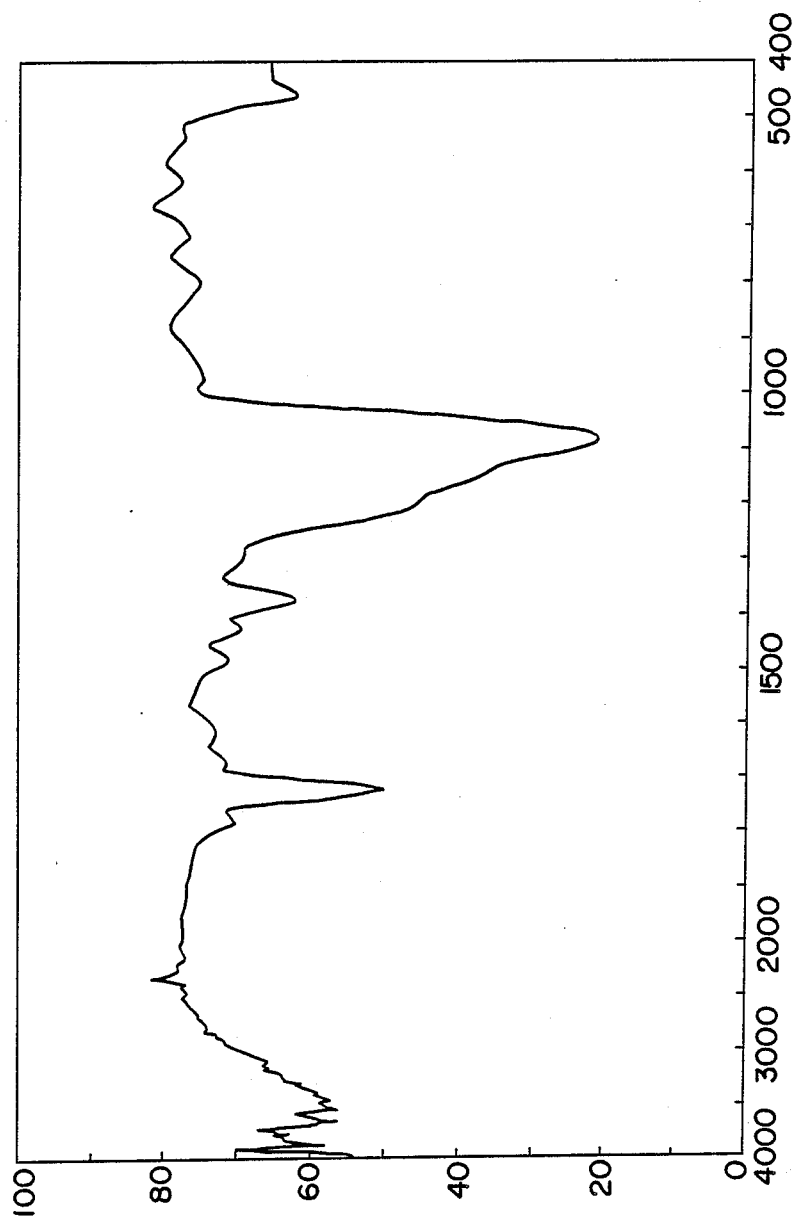
FIG. 1 shows the infrared absorption spectrum of the cured material obtained in Example 11.

Inventors of the present application have intensively researched to solve problems of conventional techniques, and as a result, the present invention has been completed.

The present invention is connected with a silicon-containing soluble polyimide precursor which mainly comprises a component represented by the general formula (I) described in the above paragraph of SUMMARY OF THE INVENTION and which has a logarithmic viscosity number of 0.05 to 5 dl/g when measured at a concentration of 0.5 g/dl at 30°±0.01° C. in a solvent; a cured material of a silicon-containing polymide obtained by vaporizing the solvent from a solution containing the above-mentioned precursor as the main component in order to crosslink/cure it; and a method for preparing them.

In the general formula (I), it is preferred that R² is

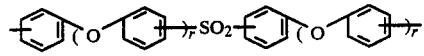

wherein r is 0 or 1, R³ is independently a group represented by

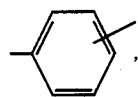

and k=3 and m=3.

The silicon-containing soluble polyimide precursor which mainly comprises a component represented by the general formula (I) and which has the above-mentioned logarithmic viscosity number may be prepared by first mutually mixing five compounds, i.e., a mole of an acid anhydride represented by the following general formula (VI) or its diester, b mole of a compound represented by the general formula (VII), c mole of compounds having the general formula (VIII) and (VIII') and d mole of a compound having the general formula (IX) in ratios in the range of the following formulae (X) and (XI) in the presence of 70% by weight or more of a solvent; performing reaction at a temperature of 0° to 200° C. for 0.2 to 20 hours; or alternatively mixing the former four compounds having the general formulae (VI) to (VIII') in optional order; further performing the reaction at a temperature of 0° to 200° C. for a period of 0.2 to 10 hours; then adding the remaining compound having the general formula (IX) thereto; adding an acid and/or a small amount of water thereto if necessary; and performing reaction at 50° to 200° C. for 0.2 to 30 hours.

$$[R^4{}_{3-k}Si-R^3-L-\{R^2-L\}_n-R^3-SiR^4{}_{3-m}O_{(k+m)/2}]_p[SiO_2]_q \quad (I)$$

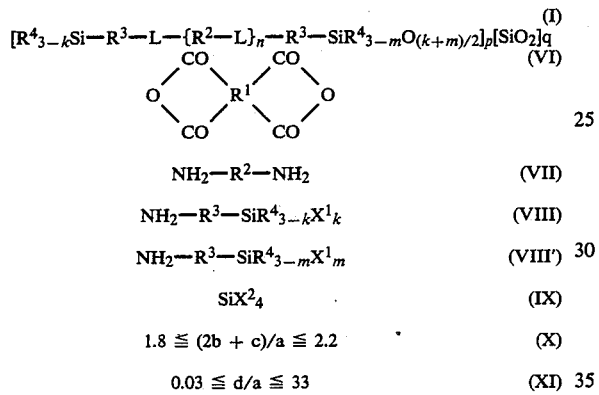
(VI)

$$NH_2-R^2-NH_2 \quad (VII)$$

$$NH_2-R^3-SiR^4{}_{3-k}X^1{}_k \quad (VIII)$$

$$NH_2-R^3-SiR^4{}_{3-m}X^1{}_m \quad (VIII')$$

$$SiX^2{}_4 \quad (IX)$$

$$1.8 \leq (2b + c)/a \leq 2.2 \quad (X)$$

$$0.03 \leq d/a \leq 33 \quad (XI)$$

wherein L, $R^2$, $R^3$, $R^4$, k, m, n, p and q are as defined above, and $X^1$ and $X^2$ are independently an alkoxy group, an acetoxy group, a halogen or a hydroxyl group.

Examples of the tetracarboxylic dianhydride and its diester represented by the general formula (VI) include pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, 2,2',3,3'-benzophenonetetracarboxylic dianhydride, bis(3,4-dicarboxyphenyl) ether dianhydride, bis(3,4-dicarboxyphenyl)sulfone dianhydride, 1,2,5,6-naphthalenetetracarboxylic dianhydride, 2,3,6,7-naphthalenetetracarboxylic dianhydride, and diesters of these compounds with alcohols.

Typical examples of the diamine represented by the general formula (VII) include aromatic diamines such as 4,4'-diamino diphenyl ether, 4,4'-diaminodiphenylmethane, 4,4'-diaminodiphenyl sulfone, 4,4'-diaminodiphenyl sulfide, 4,4'-diamino diphenyl thioether, 4,4'-di(meta-aminophenoxy)diphenyl sulfone, 4,4'-di(para-aminophenoxy)diphenyl sulfone, ortho-phenylenediamine, meta-phenylenediamine, para-phenylenediamine, benzidine, 2,2'-diaminobenzophenone, 4,4'-diaminobenzophenone, 4,4'-diaminodiphenyl-2,2'-propane, 1,5-diaminonaphthalene and 1,8-diaminonaphthalene; aliphatic diamines such as trimethylenediamine, tetramethylenediamine, hexamethylenediamine, 4,4-dimethylheptamethylenediamine, 2,11-dodecanediamine; silicon diamines such as bis(p-aminophenoxy)dimethylsilane and 1,4-bis(3-aminopropyldimethylsilyl)benzene; an alicyclic diamine such as 1,4-diaminocyclohexane; aminoalkyl-substituted aromatic compounds such as o-xylylenediamine and m-xylylenediamine; and guanamines such as acetoguanamine and benzoguanamine.

Examples of diaminopolysiloxane having amino groups at both the ends thereof represented by the general formula (V) are as follows:

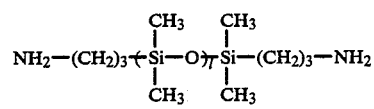

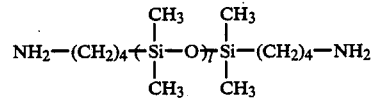

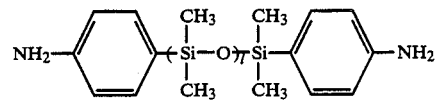

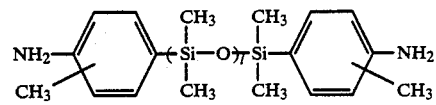

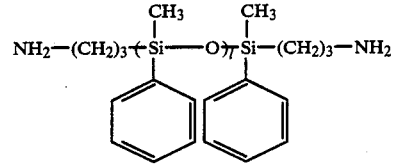

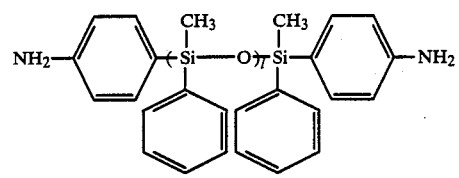

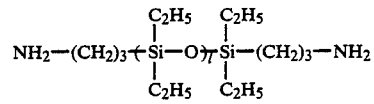

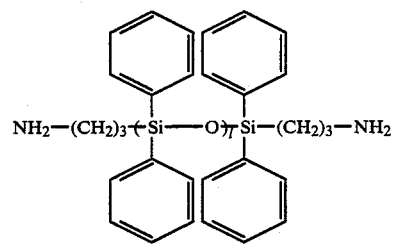

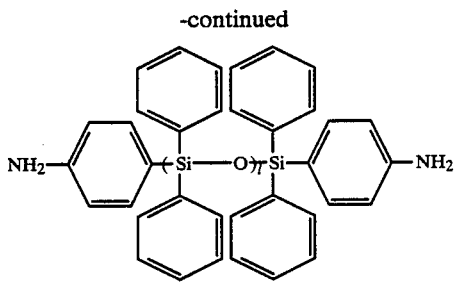

Examples of the aminosilicon compound represented by the general formulae (VIII) and (VIII') are as follows:

NH$_2$—(CH$_2$)$_3$—Si(OCH$_3$)$_3$,

NH$_2$—(CH$_2$)$_3$—Si(OC$_2$H$_5$)$_3$,

NH$_2$—(CH$_2$)$_3$—Si(CH$_3$)(OCH$_3$)$_2$,

NH$_2$—(CH$_2$)$_3$—Si(CH$_3$)(OC$_2$H$_5$)$_2$,

NH$_2$—(CH$_2$)$_3$—Si(C$_2$H$_5$)(OC$_3$H$_7$)$_2$,

NH$_2$—(CH$_2$)$_3$—Si(OCH$_3$)$_3$,

NH$_2$—(CH$_2$)$_4$—Si(OC$_2$H$_5$)$_3$,

NH$_2$—(CH$_2$)$_4$—Si(CH$_3$)(OC$_2$H$_5$)$_2$,

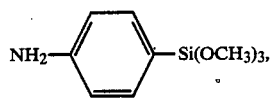

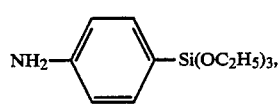

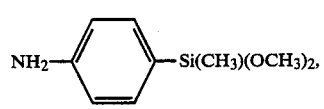

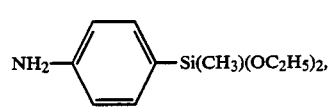

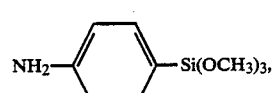

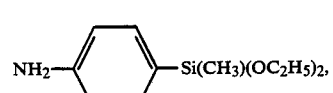

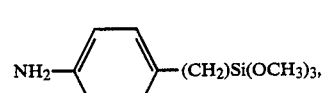

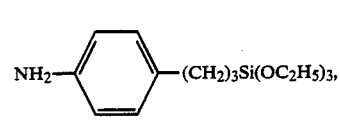

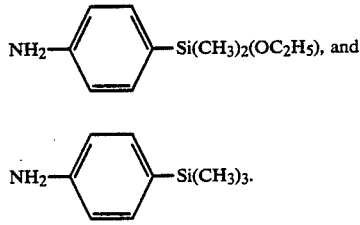

Furthermore, examples of the silicon compound represented by the general formula (IX) include Si(OCH$_3$)$_4$, Si(OC$_2$H$_5$)$_4$, Si(OC$_3$H$_7$)$_4$, Si(OC$_4$H$_9$)$_4$, Si(OC$_6$H$_{13}$)$_4$, Si(OCOCH$_3$)$_4$, Si(OCH$_3$)$_2$(OC$_2$H$_5$)$_2$, Si(OC$_3$H$_5$)$_2$(OH)$_2$ and SiCl$_4$.

Examples of the solvent (hereinafter referred to occasionally as reaction solvent) used in the reaction of the above-mentioned raw materials in the present invention include N-methylpyrrolidone, dimethylacetamide, dimethylformamide, dimethyl sulfoxide, tetramethylurea, pyridine, dimethyl sulfone, hexamethylsulfonamide, methylformamide, N-acetyl-2-pyrrolidone, toluene, xylene, ethylene glycol monomethyl ether, ethylene glycol monoethyl ether, ethylene glycol monobutyl ether, diethylene glycol monomethyl ether, diethylene glycol monoethyl ether, diethylene glycol dimethyl ether, diethylene glycol diethyl ether and mixtures of two or more thereof. In addition, mixed solvents each containing 30% by weight or more of the above-mentioned solvent and another solvent can be also used in the present invention.

Now, reference will be made to reactions of the present invention.

In the reaction solvent, there are mixed a mole of tetracarboxylic dianhydride represented by the formula (VI) or its diester, b mole of a diamine represented by the formula (VII), c mole of aminosilicon compounds represented by the formulae (VIII) and (VIII') and d mole of a silicon compound represented by the formula (IX) in order to perform reaction. In this case, ratios of the respective components are in ranges of $1.8 \leq (2b+c)/a \leq 2.2$ (X) and $0.03 \leq d/a \leq 33$ (XI).

As a result of the reaction among the compounds having the formulae (VI), (VII), (VIII) and (VIII'), a polyamic acid (or polyimide) can be obtained in which $X^1$ of a reactive group is bonded to its terminal. These four raw materials may be added in optional order, but a higher-molecular weight polymer can be obtained by first performing the reaction between the compounds having the formulae (VI) and (VII), and then adding the compounds of the formulae (VIII) and (VIII') thereto. The reaction can be performed at a temperature of 0° to 200° C. for a period of 0.2 to 20 hours. When the reaction temperature is higher, the proportion of an imido group in the polymer is greater than that of an amide acid, and $X^1$ is partially hydrolyzed, so that the condensation of the siloxane occurs to increase the molecular weight of the polymer at times. Alternatively, in the case that much imido group is desired, the amide group of the polyamide formed by a known manner, e.g., by the addition of a small amount of acetic anhydride and/or pyridine, isoquinoline or a tertiary amine such as imidazole can be partially or all converted into the imide group at ordinary temperature or at a temperature in its vicinity. In this first step of the reaction, the compound of the formula (IX) may be previously added thereto, on condition that no trouble is present.

Afterward, d mole of the silicon compound represented by the formula (IX) is added to the reaction mixture and if necessary, an acid and/or a small amount of water is added thereto, and reaction is then performed at a temperature of 50° to 200° C. for 0.2 to 30 hours. The addition of the acid and water is a known means for accelerating the condensation reaction of the siloxane.

Examples of the above-mentioned acid include mineral acids, organic acids, acidic ion exchange resins and solid acidic materials in which inorganic acids are supported in carriers.

As the mineral acids, hydrochloric acid, sulfuric acid and nitric acid are preferable. As the organic acids, there can be used formic acid, acetic acid, propionic acid, oxalic acid, citric acid, malonic acid, salicylic acid, chloroacetic acid, fluoroacetic acid, benzenesulfonic acid and toluenesulfonic acid. As the aforesaid acidic ion exchange resins, there are sulfonic acid type strongly acidic cationic exchange resins and super acidic cationic resins, and preferable examples of the ion exchange resins include Diaion-SKIB-H, Diaion-PK-228-H, Amberlite-IR-120B, Amberlite-118, Amberlite-112, Amberlite-122, Amberlite-124, Amberlite-200C and Naphion-H. Usable examples of the solid acidic materials include silica, alumina-silica, zirconia and active carbon supporting sulfuric acid or phosphoric acid.

The amount of the acid to be added is preferably 1/10 (mc+4d) mole or less, but the acid can be present in an amount above this level. As for the amount of water to be added, it may be [(mc+4d)−(2d+c)] mole or less, but when it is in excess of this level, reaction rate can be accelerated.

The formula (X) indicates a substantially equivalent relation for the formation of the imide from the acid anhydride of the formula (VI) and the amines of the formulae (VII), (VIII) and (VIII'). Thus, when the mixing ratio is less than the lower limit of the formula (X), a polyimide predominates, and when it is more than the upper limit thereof, a silicon compound predominates, so that characteristics of the compound according to the present invention are poor.

The reaction solvent is preferably used in an amount of 70% by weight or more based on the total amount of this solvent and the raw materials. When the content of the solvent is less than the above-mentioned level, the solution gels during the reaction at times, so that flowability is lost unpreferably.

According to the procedure described above, the silicon-containing soluble polyimide precursor (hereinafter referred to simply as "precursor" in certain cases) of the present invention can be obtained in which logarithmic viscosity number is within the range of 0.05 to 5 dl/g and which has desirable molecular weight. When the logarithmic viscosity number is less than 0.05, coating properties are insufficient, and the precursor in which the number is in excess of 5 is difficult to synthesize.

The fundamental structure of the silicon-containing soluble polyimide precursor obtained by the method of the present invention can be represented by the formula (I), but at the end portion of the formula (I),

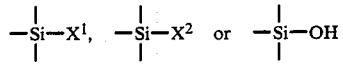

which has been partially unreacted is present. Thus, the precursor of the present invention is then calcined in order to advance the condensation reaction of the siloxane, with the result that curing and insolubilization are made owing to intermolecular crosslinking. In this way, the solid structure can be prepared from the precursor of the present invention.

With regard to the parameters p and q in the formula (I), as the ratio of g/p becomes great, characteristics of the imide become weak and those of the silicon compound come to predominate in the obtained structure. As the ratio of the g/p and the value m increase and as the value n decreases, characteristics of the inorganic material (silica) become strong. In consequence, the coefficient of thermal expansion loweres and the hardness heightens noticeably. For this reason, the ratio of g/p, i.e., w/v is preferably in the range of 0.03 to 33. In the case that $R^2$ is

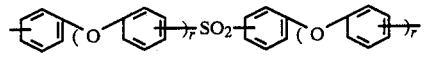

wherein r is 0 or 1 is used, the obtained precursor is particularly excellent in solubility in the solvent.

Now, reference will be made to the utilization of the precursor prepared by the present invention. In many cases, the precursor prepared by the present invention is used in the state of a solution in which it is dissolved in a solvent such as a varnish, and therefore the solution obtained by the method of the present invention is preferably concentrated or diluted with a solvent, when used. The solvent for use in this dilution may be the same as the above-mentioned reaction solvent. From the solution of the precursor obtained by the present invention, molded articles may be formed in any known manner. For example, the precursor solution is shed onto a glass plate, a copper plate or an aluminum plate, and heating is then carried out to remove the used solvent, and simultaneously crosslinking based on siloxane bond makes progress, so that a hard and tough coating film is formed thereon. The formation of laminated composite materials can be also achieved in such an operation as described above successively, but they may be obtained in another way which comprises applying a varnish as an adhesive between plural heterogeneous material sheets, and calcining them. Furthermore, the laminated materials having reinforced films can also be formed by impregnating a filler, a glass fiber or the like with a varnish, and then calcining it to cure the varnish. Conditions for the calcination depend upon a kind of used solvent, the thickness of the coating film and the like, but calcination temperature is usually in the range of 50° to 500° C., preferably in the range of 200° to 400° C. and calcination time is from about 0.5 to about 2 hours.

In the cured material having high molecular weight which is prepared by heating the precursor to calcine it, there occur dehydrating condensation

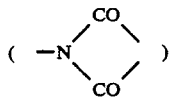

between unreacted —CONH and —COOH, other dehydrating condensation (≡Si—O—Si≡) between ≡SiOH and HOSi≡, and condensation (≡Si—O—Si≡) between ≡SiOH and $X^2Si≡$ (or $X^1Si≡$) and between ≡$SiX^1$ (or ≡$SiX^2$) and $X^1Si≡$ (or $X^2Si≡$). Therefore, $L^1$ in the molecular formula (I') of the cured material is represented only by the formula

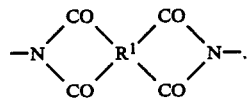
(II)

The precursor of the present invention has a desirable logarithmic viscosity number, and therefore the viscosity of its solution is proper, which enables the good operation of coating. Furthermore, when the coating film of the precursor is calcined, siloxane condensation reaction makes progress to bring about intermolecular bond, so that the coating film becomes hard and tough. In addition, the precursor coating film can exhibit a strong adhesive function for glasses, ceramics, silicon wafers, various metallic oxides and the like.

Since the cured silicon-containing polyimide of the present invention results from the strong molecular bond by the siloxane condensation reaction, and therefore the cured material has high hardness and toughness, enhanced heat resistance and low coefficient of thermal expansion which is close to that of inorganic compounds.

Since the cured material of the present invention has the enhanced heat resistance and the low coefficient of thermal expansion which is close to that of inorganic compounds as just described, it is desirable as a laminating material which is laminated onto inorganic sheets.

Moreover, in the cured material of the present invention, brittleness which is one of drawbacks of the inorganic compounds is eliminated, and hence the cured material can be formed in the state of thicker coating films as surface coating materials. In addition to this advantage, the cured material of the present case is harder than organic coating films of polyimides and the like, and thus it has practical value as a material for the boundary between organic and inorganic materials.

The cured material of the present invention can be manufactured, in an easy manner of cast molding or coating and heating, from the silicon-containing soluble polyimide which can be synthesized from the easily available raw materials under moderate conditions. Additionally, the excellent structure of the cured material can be obtained by impregnating an inorganic fiber such as a glass fiber with the precursor solution of the present case, followed by calcining.

The cured material obtained from the precursor of the present invention is excellent in heat resistance and mechanical, electrical and adhesive properties. Therefore, the precursor of the present case can be employed in various coating agents for glass, ceramics, silicon wafers and metallic oxides, liquid crystal orientation films, adhesives, inorganic fibers such as glass fibers and the like. The cured material which is obtained by subjecting the above precursor to the steps of impregnation and calcination is useful as a structure and the like in these articles.

EXAMPLES

Now, the present invention will be described in detail in reference to examples, comparative examples and use tests. However, it should be understood that the present invention is never limited by these examples.

Example 1

The atmosphere in a 1-liter flask equipped with a stirrer, a dropping funnel, a thermometer, a condenser and a nitrogen replacing device was first replaced with a nitrogen gas, and 500 g of ethyl carbitol which had been dehydrated and purified and 2.52 g (0.0101 mole) of 3,3'-diaminodiphenyl sulfone (hereinafter referred to simply as "DDS") were then placed therein, followed by stirring to obtain a uniform solution. While this solution was maintained at a temperature of 30° to 35° C., 6.54 g (0.0203 mole) of 3,3',4,4'-benzophenonetetracarboxylic dianhydride (hereinafter referred to simply as "BTDA") was added thereto, and reaction was then performed for 5 hours. Afterward, 4.33 g (0.0203 mole) of aminophenyltrimethoxysilane (hereinafter referred to simply as "APMS") (meta/para=46/54) was further added thereto and temperature was then elevated up to 150° C., and reaction was performed for 3 hours. Next, 42.28 g (0.203 mole) of tetraethoxysilane, 5 g of acetic acid and 35 g of water were added to the flask, and reaction was further carried out at 60° C. for 18 hours. At this point of time, unreacted tetraethoxysilane was not detected in the solution any more. The thus obtained silicon-containing soluble polyimide precursor of the present invention was transparent or reddish brown, and had a logarithmic viscosity number of 0.15 dl/g. The infrared absorption spectrum of the precursor is shown in FIG. 1. This spectrum indicates that the precursor contained a great deal of an imido group but scarcely contained amic acid.

Example 2

By the use of the same devices and procedure as in Example 1, 26.31 g (0.0608 mole) of bis[4-(4-aminophenoxy)phenyl] sulfone (hereinafter referred to simply as "BAPS") was mixed with 500 g of ethyl carbitol and 22.39 g (0.0695 mole) of BTDA was then added thereto, and reaction was performed at 30° C. for 6 hours. Furthermore, 3.34 g (0.0157 mole) of APMS (meta/para=46/54) was added thereto, and reaction was carried out for 2 hours. Afterward, thereto were added 36.20 g (0.174 mole) of tetraethoxysilane, 6.5 g of acetic acid and 6 g of water, followed by reaction at 60° C. for 20 hours. At this point of time, unreacted tetraethoxysilane was not detected any more. The thus obtained silicon-containing soluble polyimide precursor of the present invention had a logarithmic viscosity number of 0.32 dl/g. According to infrared absorption spectrum, this precursor contained a great deal of amic acid but scarcely contained an imide group.

Example 3

By the use of the same devices and procedure as in Example 1, 31.74 g (0.143 mole) of 3-aminopropyltriethoxysilane (hereinafter referred to simply as "APS-E"), 10.91 g (0.0717 mole) of tetramethoxysilane and 14.35 g (0.0716 mole) of 4,4'-diamino diphenyl ether (hereinafter referred to simply as "DDE") were added to and dissolved in a mixed solvent of 250 g of N-methyl-2-pyrrolidone and 250 g of 2-methoxy ethanol in order to prepare a uniform solution. While this solution was maintained at a temperature of 25° C., 31.27 g (0.143 mole) of pyromellitic dianhydride was added thereto, and reaction was performed for 2 hours and further continued at 60° C. for 6 hours. Afterward, 5.5 g of acetic acid and 4 g of water were added thereto, and reaction was then carried out at 80° C. for 4 hours. At this point, unreacted tetramethoxysilane was not detected in the solution any more. The thus obtained silicon-containing soluble polyimide precursor of the present invention had a logarithmic viscosity number of 0.082 dl/g. According to infrared absorption spectrum, this precursor contained a great deal of amic acid but scarcely contained an imide group.

Example 4

By the use of the same devices and procedure as in Example 1, 16.28 g (0.0813 mole) of DDE was dissolved in a mixed solvent of 300 g of N-methyl-2-pyrrolidone and 200 g of 2-methoxy methanol to prepare a uniform solution. To this solution was added 38.81 g (0.108 mole) of bis[3,4-dicarboxyphenyl] sulfone dianhydride (hereinafter referred to simply as "DSDA"), and reaction was then performed at 20° C. for 5 hours. Afterward, 11.41 g (0.0596 mole) of 3-aminopropylmethyldiethoxysilane was added thereto, and reaction was further carried out at 90° C. for 2 hours. To this solution were added 1.65 g (0.0108 mole) of tetramethoxysilane, 2.5 g of concentrated hydrochloric acid and 3 g of water, followed by reaction at 50° C. for 10 hours. At this point, tetramethoxysilane was not detected any more. The thus obtained silicon-containing soluble polyimide precursor of the present invention had a logarithmic viscosity number of 0.20 dl/g. According to infrared absorption spectrum, it was confirmed that there coexisted amic acid and an imido group in this precursor.

Example 5

By the use of the same devices and procedure as in Example 1, 2.57 g (0.0104 mole) of DDS and 5.28 g (0.0238 mole) of APS-E were added to 500 g of methyl carbitol, and 7.69 g (0.0239 mole) of BTDA was further added thereto, reaction was then performed at 160° C. for 12 hours. Furthermore, thereto were added 72.65 g (0.477 mole) of tetramethoxysilane, 12 g of acetic acid and 25 g of water, followed by reaction at 75° C. for 12 hours. At this point, tetramethoxysilane was not detected any more. The thus obtained silicon-containing soluble polyimide precursor of the present invention had a logarithmic viscosity number of 0.27 dl/g. According to infrared absorption spectrum, this precursor contained a great deal of an imido group but scarcely contained amic acid.

Example 6

By the use of the same devices and procedure as in Example 1, 17.98 g (0.0502 mole) of DSDA was added to 500 g 2-ethoxy ethanol, and the esterification of the acid anhydride was carried out under reflux at 135° C. for 5 hours. Furthermore, to this solution were added 10.86 g (0.0251 mole) of HAPS and 7.65 g (0.0427 mole) of 3-aminopropyltrimethoxysilane, and it was then refluxed at 135° C. for 6 hours. This solution was cooled, and while it was maintained at a temperature of 70° C., 38.22 g (0.251 mole) of tetramethoxysilane, 15 g of acetic acid and 40 g of water were added thereto, followed by reaction at 70° C. for 12 hours. At this point, unreacted trimethoxysilane was not detected any more. The thus obtained silicon-containing soluble polyimide precursor of the present invention had a logarithmic viscosity number of 0.77 dl/g. According to infrared absorption spectrum, this precursor contained a great deal of an imido group but scarcely contained amic acid.

Example 7

By the use of the same devices and procedure as in Example 1, 14.41 g (0.0490 mole) of 3,3',4,4'-biphenyltetracarboxylic dianhydride and 15.78 g (0.0490 mole) of BTDA were added to 500 g of ethyl carbitol, and reaction was carried out at 150° C. for 3 hours to esterify the acid anhydride. Furthermore, to this solution were added 14.59 g of DDS and 21.69 g (0.0980 mole) of APS-E, and reaction was then performed at 150° C. for 5 hours. This solution was cooled to 60° C., and 14.91 g (0.0980 mole) of tetramethoxysilane, 4 g of acetic acid and 3 g of water were added thereto, followed by reaction for 21 hours. At this point, unreacted tetramethoxysilane was not detected any more. The thus obtained silicon-containing soluble polyimide precursor of the present invention had a logarithmic viscosity number of 1.30 dl/g. According to infrared absorption spectrum, this precursor contained a great deal of an imido group but scarcely contained amic acid.

Example 8

The same procedure as in Example 4 was repeated with the exception that concentrated hydrochloric acid was not added and that the secondary reaction was performed for 22 hours. When the secondary reaction was over, unreacted tetramethoxysilane was not detected in the reaction solution any more. The thus obtained silicon-containing soluble polyimide precursor of the present invention had a logarithmic viscosity number of 0.023 dl/g. According to infrared absorption spectrum, it was confirmed that there coexisted amic acid and an imido group in this precursor.

Example 9

The same procedure as in Example 4 was repeated with the exception that water was not added and that the secondary reaction was performed for 16 hours. When the secondary reaction was over, unreacted tetramethoxysilane was not detected in the reaction solution any more. The thus obtained silicon-containing soluble polyimide precursor of the present invention had a logarithmic viscosity number of 0.021 dl/g. According to infrared absorption spectrum, it was confirmed that there coexisted amic acid and an imido group in this precursor.

Example 10

The same procedure as in Example 4 was repeated with the exception that concentrated hydrochloric acid and water were not added and that the secondary reaction was performed for 28 hours. When the secondary reaction was over, unreacted tetramethoxysilane was not detected in the reaction solution any more. The thus obtained silicon-containing soluble polyimide precursor of the present invention had a logarithmic viscosity number of 0.024 dl/g. According to infrared absorption spectrum, it was confirmed that there coexisted amic acid and an imido group in this precursor.

Comparative Example 1

By the use of the same devices and procedure as in Example 1, 55.56 g (0.267 mole) of tetraethoxysilane, 5.5 g of acetic acid and 60 g of water were added to 500 g of methyl carbitol, and reaction was then carried out at 30° C. for 18 hours. At this point of time, unreacted tetraethoxysilane was not detected in the reaction solution any more, and a transparent tetraethoxysilane oligomer was obtained.

Comparative Example 2

By the use of the same devices and procedure as in Example 1, 44.61 g (0.103 mole) of BAPS was added to and dissolved in 500 g of ethyl carbitol. While this solution was maintained at a temperature of 25° C., 37.98 g (0.118 mole) of BTDA was added thereto, and reaction was then performed for 5 hours. Afterward, 5.56 g (0.0265 mole) of APMS was further added thereto, and reaction was then performed for 2 hours in order to obtain a polyamic acid solution.

For reference, Table 1 shows amounts of the raw materials used in Examples 1 to 10 and Comparative Examples 1 and 2, i.e., a, b, c and d moles, as well as values of (2b+c)/a and d/a.

TABLE 1

|  | a mole | b mole | c mole | d mole | (2b + c)/a | d/a |
|---|---|---|---|---|---|---|
| Example 1 | 0.0203 | 0.0101 | 0.0203 | 0.203 | 2.00 | 10 |
| Example 2 | 0.0695 | 0.0608 | 0.0157 | 0.174 | 1.98 | 2.50 |
| Example 3 | 0.143 | 0.0716 | 0.143 | 0.0717 | 2.00 | 0.50 |
| Example 4 | 0.108 | 0.0813 | 0.0596 | 0.0108 | 2.06 | 0.1 |
| Example 5 | 0.0239 | 0.0104 | 0.0238 | 0.477 | 1.87 | 20.0 |
| Example 6 | 0.0502 | 0.0251 | 0.0427 | 0.251 | 1.85 | 5 |
| Example 7 | 0.0980* | 0.0588 | 0.0980 | 0.0980 | 2.20 | 1 |
| Example 8 | 0.108 | 0.0813 | 0.0596 | 0.0108 | 2.06 | 0.1 |
| Example 9 | " | " | " | " | " | " |
| Example 10 | " | " | " | " | " | " |
| Comp. Ex. 1 | — | — | — | 0.267 | — | — |
| Comp. Ex. 2 | 0.118 | 0.103 | 0.0265 | — | 1.97 | 0 |

*0.0980 = 0.0490 + 0.0490

Examples 11 to 20 and Comparative Examples 3 and 4

Glass plates were coated with the respective varnishes synthesized in Examples 1 to 10 and Comparative Examples 1 and 2, and calcination was then given at 300° C. for 1 hour in an electric furnace, so that each coating film having a thickness of 1.5 μm was formed on the glass plate. Coating properties, surface hardness and heat resistance were evaluated by heating the thus formed coating films up to a high temperature, and then measuring weight reduction thereof. The results are set forth in Table 2.

Incidentally, FIG. 1 shows the infrared absorption spectrum of the cured material according to the present invention obtained in Example 11.

The surface hardness in Table 2 indicates pencile hardness measured in accordance with JIS K5400. The coating properties were evaluated by visually observing the appearance of the coating films formed on the glass plates through the above-mentioned calcination, and the estimation of "good" was given in the case that requirements of (1) the formation of the coating film having substantially uniform thickness all over the glass plate, (2) smoothness on the coating film and (3) no cracks were satisfied. Weight reduction was expressed in "weight reduction (%)" in the case that the temperature of each coating film was elevated from ordinary temperature to 700° C. at a temperature rise rate of 10° C./minute by the use of a thermobalance TGD 5000 made by Shinku Riko Co., Ltd.

TABLE 2

|  | Coating Liquid | Coating Properties | Surface Hardness | Weight Reduction (%) |
|---|---|---|---|---|
| Example 11 | Example 1 | Good | ≧9H | 8.7 |
| Example 12 | Example 2 | Good | ≧9H | 15.6 |
| Example 13 | Example 3 | Good | 8H | 26.2 |
| Example 14 | Example 4 | Good | 8H | 29.8 |
| Example 15 | Example 5 | Good | ≧9H | 10.2 |
| Example 16 | Example 6 | Good | ≧9H | 20.3 |
| Example 17 | Example 7 | Good | ≧9H | 24.2 |
| Example 18 | Example 8 | Good | ≧9H | 29.8 |
| Example 19 | Example 9 | Good | ≧9H | 29.7 |
| Example 20 | Example 10 | Good | ≧9H | 29.5 |
| Comp. Ex. 3 | Comp. Ex. 1 | Cracks | — | 1.1 |
| Comp. Ex. 4 | Comp. Ex. 2 | Good | 3H | 43.7 |

What is claimed is:

1. A silicon-containing soluble polyimide precursor which comprises a component represented by the following formula I and which has a logarithmic viscosity number of 0.05 to 5 dl/g when measured at a concentration of 0.5 g/dl at 30±0.01° C. in a solvent:

$$[R^4{}_{3-k}SiR^3{-}L{-}(R^2{-}L)_n{-}R^3{-}SiR^4{}_{3-m}O_{(k+m)/2}]_p[SiO_2]_q \quad (I)$$

wherein L is a structural unit of any of the following formula (II), (III) and (IV); $R^2$ is an aliphatic group having 2 to 12 carbon atoms, an alicyclic group having 4 to 30 carbon atoms, an aromatic aliphatic group having 6 to 30 carbon atoms, a carbon cyclic aromatic group having 6 to 30 carbon atoms including a group represented by the formula

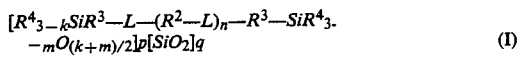

wherein r is 0 or 1,
A polysiloxane group represented by the following formula (V) or a group represented by the following formula (V'); $R^3$ is

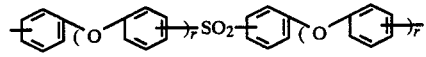

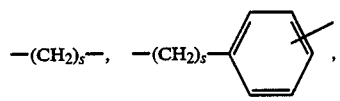

wherein s is an integer of 1 to 4; and $R^4$ is independently an alkyl group having 1 to 6 carbon atoms, a phenyl group or an alkyl-substituted phenyl group having 7 to 12 carbon atoms; k is an integer of $0 \leq k \leq 3$; m is $0 \leq m \leq 3$, $k+m \geq 1$; n is an integer of at least 1; and each of p and q is a positive integer;

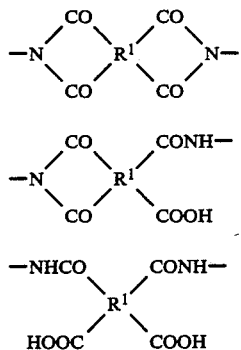

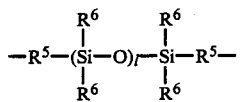

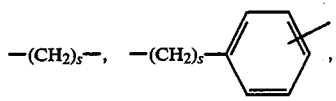

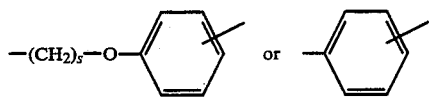

wherein $R^1$ is a tetravalent carbon cyclic aromatic group, and two carbonyl groups constituting one imide in the formulae (II) and (III) are mutually attached to ortho positions, and one carboamide group and one carboxyl group in the formulae (III) and (IV) are mutually attached to ortho-positions:

$$-R^5-(Si-O)_l-Si-R^5- \quad\text{(V)}$$
(with $R^6$ substituents)

wherein $R^5$ is independently $-(CH_2)_s-$, $-(CH_2)_s-\text{phenyl}$, $-(CH_2)_s-O-\text{phenyl}$ or $-\text{phenyl}$ wherein s is an integer of 1 to 4, and $R^6$ is independently an alkyl group having 1 to 6 carbon atoms, a phenyl group or an alkyl-substituted phenyl group having 7 to 12 carbon atoms, l is a value of $1 \leq l \leq 100$;

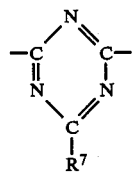
(V')

R is an aliphatic group having 8 or less carbon atoms, an aromatic aliphatic group of hydrogen;

said logarithmic viscosity number being ηinh which can be represented by the following formula:

$\eta inh = \ln(\eta/\eta_o)/C$ wherein $n$ is the viscosity measured at $3\pm0.01°$ C. at a concentration of 0.5 g/dl in a solvent by the use of a Ubbelode's viscometer, $\eta$ is the viscosity of the solvent at the same temperature by the use of the same viscometer, and C is a concentration of 0.5 g/dl.

2. A silicon-containing soluble polyimide precursor according to claim 1 wherein $R^2$ in the formula (I) is

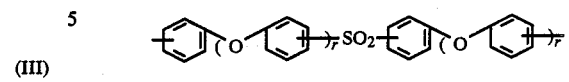

wherein r is 0 or 1, and $R^3$ is independently a group represented by

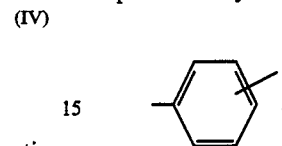

3. A silicon-containing soluble polyimide precursor according to claim 1 wherein k in the formula (I) is 3 and m is 3.

4. A silicon-containing soluble polyimide precursor according to claim 2 wherein k in the formula (I) is 3 and m is 3.

5. A cured material of a silicon-containing polyimide comprising a component represented by the following general formula (I')

$$[R^4{}_{3-k}Si-R^3-L^1-(R^2-L^1)_n-R^3-SiR^4{}_{3-m}O_{(k+m)/2}]_v[SiO_2]_w \quad \text{(I')}$$

wherein $L^1$ is a structural unit of the following formula (II); $R^2$ is an aliphatic group having 2 to 12 carbon atoms, an alicyclic group having 4 to 30 carbon atoms, an aromatic aliphatic group having 6 to 30 carbon atoms, a carbon cyclic aromatic group having 6 to 30 carbon atoms including a group represented by the formula

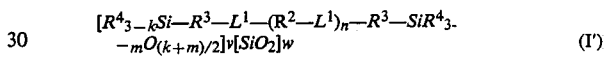

wherein r is 0 or 1, a polysiloxane group represented by the following formula (V) or a group represented by the following formula (V');

$R^3$ is $-(CH_2)_s-$, $-(CH_2)_s-\text{phenyl}$,

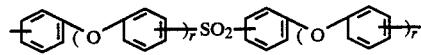

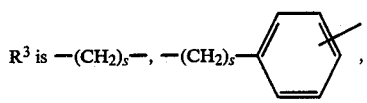

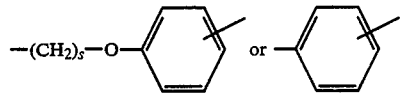

wherein s is an integer of 1 to 4; and $R^4$ is independently an alkyl group having 1 to 6 carbon atoms, a phenyl group or alkyl-substituted phenyl group having 7 to 12 carbon atoms; k is an integer of $0 \leq k \leq 3$; m is $0 \leq m \leq 3$ but $k+m \geq 1$; n is an integer of 1 or more; and each of v and w is a positive integer;

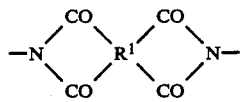

(II)

wherein $R^1$ is a tetravalent carbon cyclic aromatic group, and two carbonyl groups constituting one imide are mutually attached to ortho-positions;

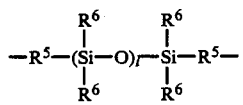

(V)

wherein $R^5$ is independently

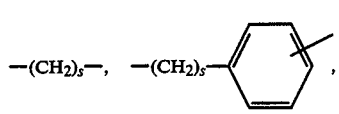

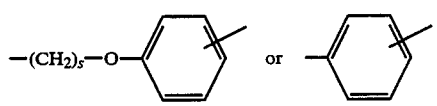

wherein s is an integer of 1 to 4, and $R^6$ is independently an alkyl group having 1 to 6 carbon atoms, a phenyl group or an alkyl-substituted phenyl group having 7 to 12 carbon atoms, l is a value of $1 \leq l \leq 100$;

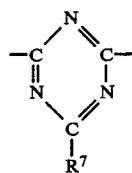

(V')

wherein $R^7$ is an aliphatic group having 8 or less carbon atoms, an aromatic aliphatic group or hydrogen.

6. A cured material of a silicon containing polyimide according to claim 5 wherein $R^2$ in the formula (I') is

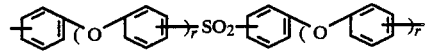

wherein r is 0 or 1, and $R^3$ is independently a group represented by

7. A cured material of a silicon-containing polyimide according to claim 5 wherein k in the formula (I) is 3 and m is 3.

8. A cured material of a silicon-containing polyimide according to claim 6 wherein k in the formula (I) is 3 and m is 3.

9. A method for preparing a silicon-containing soluble polyimide precursor which comprises a component represented by the following general formula (I) and which has a logarithmic viscosity number of 0.05 to 5 dl/g, said method comprising the steps of first mutually mixing the following five compounds, (a) a mole of an acid anhydride represented by the following general formula (VI) or its diester, (b) b mole of a compound represented by the general formula (VII), (c) c mole of compounds having the general formula (VIII) and (VIII'), and (d) d mole of a compound having the general formula (IX) in ratios in the range of the following formulae (X) and (XI) in the presence of 70% by weight or more of a solvent; carrying out reaction at a temperature of 0° to 200° C. for 0.2 to 20 hours; or alternatively mixing the former four compounds having the general formula (VI) to (VIII') in any order; carrying out further reaction at a temperature of 20° to 200° C. for a period of 0.2 to 10 hours; then adding the fifth compound (e) having the general formula (IX) thereto; and carrying out reaction at 50° to 200° C. for 0.2 to 30 hours:

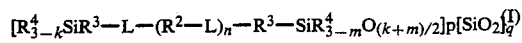

(I)

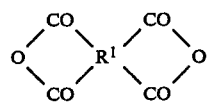

(VI)

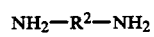

(VII)

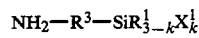

(VIII)

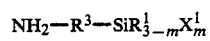

(VIII')

(IX)

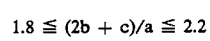

(X)

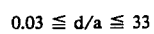

(XI)

wherein L is a structural unit of any of the following formula (II), (III) and (IV); $R^2$ is an aliphatic group having 2 to 12 carbon atoms, an alicyclic group having 4 to 30 carbon atoms, an aromatic aliphatic group having 6 to 30 carbon atoms, a carbon cyclic aromatic group having 6 to 30 carbon atoms including a group represented by the formula

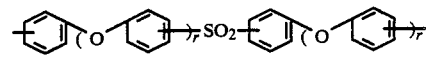

wherein r is 0 to 1, a polysiloxane group represented by the following formula (V) or a group represented by the following formula

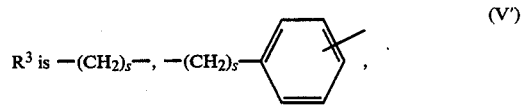

(V')

$R^3$ is

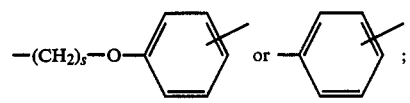

wherein s is an integer of 1 to 4; and $R^4$ is independently an alkyl group having 1 to 6 carbon atoms, a phenyl group or an alkyl-substituted phenyl group having 7 to 12 carbon atoms; k is an integer of $0 \leq k \leq 3$, m is $0 \leq m \leq 3$, $k+m \geq 1$, n is an integer of 1 or more, and each of p and q is a positive integer;

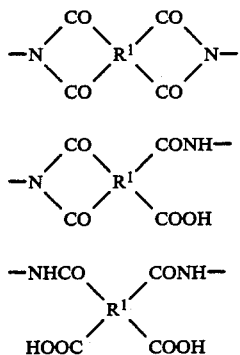 (II)

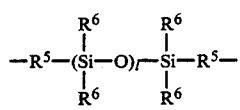 (III)

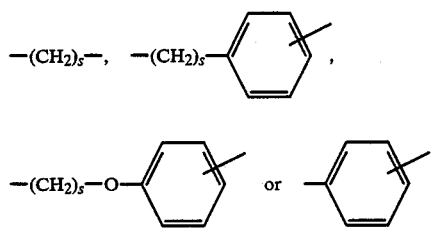 (IV)

wherein R¹ is a tetravalent carbon cyclic aromatic group, and two carbonyl groups constituting one imide in the formulae (II) and (III) are mutually attached to ortho positions, and one carboamide group and one carboxyl group in the formulae (III) and (IV) are mutually attached to ortho positions;

$$-R^5-(Si-O)_l-Si-R^5-$$
(with $R^6$ substituents) (V)

wherein R⁵ is independently $-(CH_2)_s-$, $-(CH_2)_s-$⌬ , $-(CH_2)_s-O-$⌬  or  ⌬ wherein s is an integer of 1 to 4, and R⁶ is independently an alkyl group having 1 to 6 carbon atoms, a phenyl group or an alkyl-substituted phenyl group having 7 to 12 carbon atoms, l is a value of $1 \leq l \leq 100$;

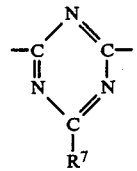 (V')

wherein R⁷ is an aliphatic group having 8 or less carbon atoms, an aromatic aliphatic group or hydrogen;

X¹ and X² are independently an alkoxy group, an acetoxy group, a halogen or a hydroxyl group;

said logarithmic viscosity number being $\eta inh$ which can be represented by the following formula:

$$\eta_{inh} = \ln(\eta/\eta_o)/C$$

wherein $\eta$ is a viscosity measured at 30° ±0.01° C. at a concentration of 0.5 g/dl in a solvent by the use of a Ubbelohde's viscometer, $\eta_o$ is a viscosity of the solvent at the same temperature by the use of the same viscometer, and C is a concentration of 0.5 g/dl.

10. A method for preparing a silicon-containing polyimide precursor according to claim 9 wherein R² in the formula (I) is

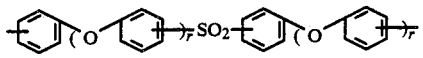

wherein r is 0 or 1, and R³ is independently a group represented by

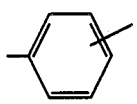

11. A method for preparing silicon-containing polyimide precursor according to claim 9 wherein k in the formula (I) is 3 and m is 3.

12. A method for preparing silicon-containing polyimide precursor according to claim 10 wherein k in the formula (I) is 3 and m is 3.

13. A method for preparing a cured material wherein a solution including the silicon-containing soluble polyimide precursor of claim 9 as a main component is heated at a temperature of 50 to 500 degrees C. to vaporize the solvent and to simultaneously crosslink/cure the precursor.

14. A method for preparing a cured material according to claim 13 wherein R² in the formula (I) is

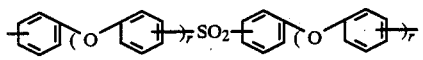

wherein r is 0 or 1, and R³ is independently a group represented by

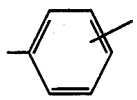

15. A method for preparing a cured material according to claim 13 wherein k in the formula (I) is 3 and m is 3.

* * * * *